US006437084B1

(12) United States Patent
Birsak et al.

(10) Patent No.: US 6,437,084 B1
(45) Date of Patent: Aug. 20, 2002

(54) METHOD OF PREPARING A POLY (ARYLENE ETHER) AND A POLY (ARYLENE ETHER) PREPARED THEREBY

(75) Inventors: Joop Birsak, Halstere (NL); Hugo Gerard Eduard Ingelbrecht, Essen (BE); David Parrillo, Schenectady, NY (US); Mukund Parthasarathy, Delmar, NY (US); Probjot Singh, Delmar, NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/683,037

(22) Filed: Nov. 12, 2001

(51) Int. Cl.$^7$ .......................... C08G 65/38; C08G 65/44
(52) U.S. Cl. ....................... 528/217; 528/104; 528/212; 528/214; 528/483; 528/491; 528/495; 528/496; 528/497; 528/502 R; 528/503
(58) Field of Search .................... 528/86, 104, 483, 528/471, 495, 496, 497, 503, 217, 212, 214, 491

(56) References Cited

U.S. PATENT DOCUMENTS

| 3,306,874 A | 2/1967 | Hay |
| 3,306,875 A | 2/1967 | Hay |
| 3,838,102 A | 9/1974 | Bennett, et al. |
| 4,092,294 A | 5/1978 | Bennett, Jr. et al. |
| 4,477,651 A | 10/1984 | White et al. |
| 5,068,310 A | 11/1991 | Shaffer |
| 2002/0013446 A1 | 1/2002 | Mitsui et al. |

FOREIGN PATENT DOCUMENTS

| EP | 153074 A2 | 4/1985 |
| EP | 1 167 419 A2 | 2/2002 |
| EP | 1 167 421 A2 | 2/2002 |

OTHER PUBLICATIONS

D. M. White and S. A. Nye,C NMR *Study of Poly(2, 6–dimethyl–1,4–phenylene oxide)s. Sites of Amine Incorporation* Macromolecules (1990), vol. 23, No. 5, pp. 1318–1329.

K. P. Chan, D. S. Argyropoulos, D. M. White, G.W. Yeager, and A. S. Hay, *Facile Quantitative Analysis of Hydroxyl End Groups of Poly(2,6–dimethyl–1,4–phenylene oxide)s by 31P NMR Spectroscopy.* Macromolecules (1994), vol. 27, pp. 6371–6375.

H. A. M. Vanaert et al., *Controlled Molecular Weight by the Precipitation Polymerization of 2,6–Dimethylphenol* Journal Of Macromolecular Science–Pure And Applied Chemistry, (1995) vol. A32, No. 3, pp. 515–523.

Scisearch–Abstract of Kobunshi Ronbunshu (1994) vol. 51, No. 3, pp. 157–166.

Primary Examiner—Duc Truong (57) ABSTRACT

A method of preparing a poly(arylene ether) includes oxidatively coupling a monohydric phenol in a reaction solution at a reaction temperature that exceeds the cloud point temperature of the reaction solution. The oxidative coupling occurs in the presence of a metal complex catalyst, and when the catalyst includes an amine ligand, the method facilitates incorporation of the amine ligand into the poly(arylene ether) resin. The amine-incorporated poly(arylene ether) resins prepared by the method are useful in the preparation of higher molecular weight poly(arylene ether) resins and compatibilized blends of poly(arylene ether) resins with other thermoplastics.

33 Claims, 2 Drawing Sheets

METHOD OF PREPARING A POLY (ARYLENE ETHER) AND A POLY (ARYLENE ETHER) PREPARED THEREBY

BACKGROUND OF INVENTION

Poly(arylene ether) resins are well known and widely used thermoplastics valued for properties including heat resistance, stiffness, and high impact strength. Various methods of preparing poly(arylene ether) homopolymers and copolymers are known, such as the self-condensation of a monovalent phenol in the presence of an oxygen-containing gas, and a catalyst. When primary or secondary amines are used in the reaction process, the amine may become incorporated into the poly(arylene ether) in the form of Mannich end groups. See, for example, U.S. Pat. No. 4,477,651 to White et al., U.S. Pat. No. 4,092,294 to Bennett, Jr. et al., and D. M. White and S. A. Nye, *Macromolecules* (1990), vol. 23, no. 5, pages 1318–1329. A general reaction scheme for amine incorporation in poly(arylene ether) is shown below:

Incorporated amine groups may serve a desired function. For example, the amine groups may be lost thermally during processing or blending, resulting in the generation of reactive functional groups on the polymer, such as quinone methide groups. These reactive functional groups can couple with each other to increase the molecular weight of the poly(arylene ether). When the poly(arylene ether) is blended with another resin (e.g., rubber, high impact polystyrene, polyamide), the reactive functional groups can react with the other resin to generate a graft copolymer that improves the physical properties of the resin blend. The formation of such graft copolymers is particularly useful for compatibilizing blends of poly(arylene ether) and polyamide resins.

Current methods of producing poly(arylene ether)s include solution polymerization and precipitation methods. An example of a precipitation method is found in European Patent Application No. 153,074 A2 to Kawaki et al., which generally describes a process for producing a poly(arylene ether) employing a catalyst composed of a cuprous salt and a primary or secondary amine in a mixed solvent consisting of 1 part by weight of a good solvent for the resulting poly(arylene ether) and 0.9 to 1.1 part by weight of a poor solvent for the resulting poly(arylene ether). The poly (arylene ether) is described as precipitating during the polymerization, and it is isolated by filtration and washing. The amount of amine incorporation is not mentioned.

An example of a solution polymerization method includes U.S. Pat. No. 4,477,651 to White et al., which generally describes the preparation of polyphenylene ethers by oxidatively coupling a phenolic compound in the presence of a catalyst which comprises a copper complex of a copper compound with an N,N-disubstituted alkylene or cycloalkylene diamine, a tertiary amine, a bromine-containing-compound, and dimethyl amine. Short reaction times were obtained, and the high molecular weight product increased in molecular weight and showed a marked decrease in bound nitrogen after molding. Bound amine prior to molding was present at levels of up to 1040 parts per million, measured as atomic nitrogen.

The above methods of preparing poly(arylene ether)s do not describe how to control the incorporation of amine groups into a poly(arylene ether). There remains a need for an economical, scalable method for the production of poly (arylene ether) resins having a substantial and reproducible content of incorporated amine.

SUMMARY OF INVENTION

The above-described and other drawbacks and disadvantages of the prior art are alleviated by a method of preparing a poly(arylene ether), comprising oxidatively coupling a monohydric phenol at a reaction temperature, $T_{rxn}$, using an oxygen-containing gas in the presence of a solvent and a complex metal catalyst to produce a reaction mixture comprising a poly(arylene ether) resin; wherein the reaction mixture has a cloud point, $T_{cloud}$; and wherein $T_{rxn}$ is greater than $T_{cloud}$.

In another embodiment, a method of preparing a poly (arylene ether), comprises oxidatively coupling 2,6-dimethylphenol and 2,3,6-trimethylphenol at a reaction temperature, $T_{rxn}$, using an oxygen-containing gas in the presence of toluene and a complex copper catalyst to produce a reaction mixture comprising a poly(arylene ether) copolymer resin; wherein $T_{rxn}$ satisfies the inequality $$T_{rxn} > \left( \frac{\phi_s - (0.296 \times IV + 1.27 \times TMP - 35.7)}{1.97(1 - 0.00795 \times IV - 0.0249 \times TMP)} \right)$$

where $\phi_s$ is the copolymer concentration (expressed in weight percent), IV is the intrinsic viscosity of the copolymer in chloroform at 25° C. (expressed in mL/g), and TMP is the 2,3,6-trimethylphenol content of the copolymer (expressed in weight percent).

The present inventors have discovered that the precipitation of a poly(arylene ether) resin in a reaction mixture may interfere with amine incorporation reactions. The method is therefore particularly useful for the preparation of poly (arylene ether) copolymers having reduced solubility compared to the homopolymer poly(2,6-dimethyl-1,4-phenylene ether). This method is also useful for the preparation of poly (arylene ether) homopolymers in a mixed solvent system in which the homopolymer has less solubility than it would in an aromatic solvent alone. The method is also particularly suitable for industrial scale reactions, where the desire for high throughput may dictate high concentrations of poly (arylene ether) in the reaction mixture.

Other embodiments, including poly(arylene ether) resins prepared according to the methods, are described below.

DETAILED DESCRIPTION

One embodiment is a method of preparing a poly(arylene ether), comprising oxidatively coupling a monohydric phenol at a reaction temperature, $T_{rxn}$, using an oxygen-containing gas in the presence of a solvent and a complex metal catalyst to produce a reaction mixture comprising a poly(arylene ether) resin; wherein the reaction mixture has a cloud point, $T_{cloud}$; and wherein $T_{rxn}$ is greater than $T_{cloud}$.

There is no particular limitation on the monohydric phenol used in the poly (arylene ether) synthesis. Suitable monohydric phenols include those having the formula:

wherein each $Q^1$ is independently halogen, $C_1$–$C_7$ primary or secondary alkyl, phenyl, $C_1$–$C_7$ haloalkyl, $C_1$–$C_7$ aminoalkyl, $C_1$–$C_7$ hydrocarbonoxy, $C_2$–$C_7$ halohydrocarbonoxy wherein at least two carbon atoms separate the halogen and oxygen atoms, or the like; and each $Q^2$ is independently hydrogen, halogen, $C_1$–$C_7$ primary or secondary alkyl, phenyl, $C_1$–$C_7$ haloalkyl, $C_1$–$C_7$ hydrocarbonoxy, $C_2$–$C_7$ halohydrocarbonoxy wherein at least two carbon atoms separate the halogen and oxygen atoms, or the like. Preferably, each $Q^1$ is alkyl or phenyl, especially $C_{1-4}$ alkyl, and each $Q^2$ is hydrogen or methyl.

In a preferred embodiment, the monohydric phenol comprises 2,6-dimethylphenol (hereinafter "DMP") and 2,3,6-trimethylphenol (hereinafter "TMP"). In this embodiment, the DMP and TMP may be used in any proportion, from weight ratios of 99:1 to 1:99. Within this range, it may be preferred to use a DMP:TMP weigh ratio of at least about 1:1, more preferably at least about 3:1, and even more preferably at least about 4:1. Also within this range, it may be preferred to use up to about 20:1, more preferably up to about 10:1, and even more preferably up to about 6:1.

The oxidative coupling of the monohydric phenol uses an oxygen-containing gas, which is typically oxygen ($O_2$) or air, with oxygen being preferred.

The monohydric phenol is oxidatively coupled in the presence of a solvent and a complex metal catalyst. Suitable organic solvents include aliphatic alcohols, ketones, aliphatic and aromatic hydrocarbons, chlorohydrocarbons, nitrohydrocarbons, ethers, esters, amides, mixed ether-esters, sulfoxides, and the like, and combinations comprising at least one of the foregoing organic solvents, providing they do not interfere with or enter into the oxidation reaction. In a preferred embodiment, the solvent comprises a $C_6$–$C_{18}$ aromatic hydrocarbon, including, for example, toluene, xylenes, and the like, and mixtures thereof. A highly preferred solvent is toluene.

The solvent may comprise, in addition to a $C_6$–$C_{18}$ aromatic hydrocarbon, a $C_3$–$C_8$ aliphatic alcohol that is a poor solvent for the poly(arylene ether), such as, for example, n-propanol, isopropanol, n-butanol, t-butanol, n-pentanol, and the like, and combinations comprising at least one of the foregoing $C_3$–$C_8$ aliphatic alcohols. A preferred $C_3$–$C_8$ aliphatic alcohol is n-butanol. The solvent may further comprise, n addition to a $C_6$–$C_{18}$ aromatic hydrocarbon and a $C_3$–$C_8$ aliphatic alcohol, methanol or ethanol, which act as an anti-solvent for the poly(arylene ether). The $C_6$–$C_{18}$ aromatic hydrocarbon, the $C_3$–$C_8$ aliphatic alcohol, and the methanol or ethanol may be combined in any proportion, but it may be preferred that the solvent comprise at least about 50 weight percent of the $C_6$–$C_{18}$ aromatic hydrocarbon.

The complex metal catalyst may comprise a metal ion. Preferred metal ions include ions from Group VIB, VIIB, or IB of the periodic table, and combinations thereof. Of these, ions of chromium, manganese, cobalt, copper, and combinations comprising at least one of the foregoing ions may be preferred, with copper ions ($Cu^+$ and $Cu^{++}$) being highly preferred.

The complex metal catalyst may further comprise a nitrogen-containing ligand. The nitrogen-containing ligand may include, for example, alkylenediamine ligands, primary monoamines, secondary monoamines, tertiary monoamines, aminoalcohols, oxines, combinations comprising at least one of the foregoing nitrogen-containing ligands, or the like.

Suitable alkylenediamine ligands include those having the formula $$(R^b)_2N\!-\!R^a\!-\!N(R^b)_2$$

wherein $R^a$ is a substituted or unsubstituted divalent residue wherein two or three aliphatic carbon atoms form the closest link between the two diamine nitrogen atoms; and each $R^b$ is independently hydrogen or $C_1$–$C_8$ alkyl. Preferred alkylenediamine ligands include those in which $R^a$ is ethylene (—$CH_2CH$—) or trimethylene (—$CH_2CH_2CH_2$—), and each $R^b$ is independently hydrogen, isopropyl, or a $C_4$–$C_8$ alpha-tertiary alkyl group. Highly preferred alkylenediamine ligands include N,N'-di-t-butylethylenediamine and N,N,N',N'-tetramethyl-1,3-diaminopropane.

Suitable primary monoamines include $C_3$–$C_{12}$ primary alkylamines, such as, for example, n-propylamine, i-propylamine, n-butylamine, sec-butylamine, t-butylamine, n-penylamine, n-hexylamine, cyclohexylamine, combinations comprising at least one of the foregoing primary monoamines, and the like. A highly preferred primary monoamine is n-butylamine.

Suitable secondary monoamines include secondary monoamines having the structure $(R^c)(R^d)NH$, wherein $R^c$ and $R^d$ are each independently a $C_1$–$C_{11}$ alkyl group, with the proviso that $R^c$ and $R^d$ collectively have a total of four to twelve carbon atoms. Examples of secondary monoamines include di-n-propylamine, n-propyl-n-butylamine, di-n-butylamine, d-t-butylamine, n-butyl-n-penylamine, di-n-hexylamine, and the like, with di-n-butylamine being preferred.

Suitable tertiary monoamines include tertiary monoamines having the structure $(R^e)(R^f)(R^g)N$, wherein $R^e$ and $R^f$ and $R^g$ are each independently a $C_1$–$C_{16}$ alkyl group, with the proviso that $R^e$ and $R^f$ and $R^g$ collectively have a total of four to eighteen carbon atoms. Examples of tertiary monoamines include triethylamine, tri-n-propylamine, tri-n-butylamine, dimethyl-n-butylamine, dimethyl-n-penylamine, diethyl-n-butylamine, triycyclohexylamine, and the like. In addition, cyclic tertiary amines, such as pyridine, alpha-collidine, gamma-picoline, and the like, can be used. Highly preferred tertiary monoamines include dimethyl-n-butylamine. Additional primary, secondary, and tertiary amines are described in U.S. Pat. Nos. 3,306,874 and 3,306,875 to Hay.

Suitable aminoalcohols include $C_4$–$C_{12}$ aminoalcohols having one nitrogen atom and an alcohol oxygen, wherein at least two carbon atoms separate the amino nitrogen and the alcohol oxygen. Examples of aminoalcohols include N,N-diethylethanolamine, 4-butanolamine, N-methyl-4- butanolamine, diethanolamine, triethanolamine, N-phenylethanolamine, and the like, and combinations comprising at least one of the foregoing aminoalcohols. Highly preferred aminoalcohols include triethanolamine and N-phenylethanolamine.

Suitable oxines include those having the formula wherein $R^1$–$R^6$ are each independently hydrogen, halogen, hydroxyl, nitro, amino, $C_1$–$C_6$ alkyl, or $C_1$–$C_6$ alkoxyl. Examples of oxines include oxine, 5-methyloxine, 5-hydroxyoxine, 5-nitroxine, 5-aminoxine, 2-methyloxine, and the like, and combinations comprising at least one of the foregoing oxines. Highly preferred oxines include oxine and 5-methyloxine.

The alkylenediamine ligands, primary monoamines, secondary monoamines, aminoalcohols, and oxines, when present, may be used at about 0.01 to about 25 moles per 100 moles of monohydric phenol. The tertiary monoamines may be used at about 0.1 to about 1,500 moles per 100 moles of monohydric phenol. Selections of appropriate concentrations within these ranges may be made by those of ordinary skill in the art without undue experimentation, and selected concentrations may reflect the presence of other reaction components or products, such as water, that may affect catalyst efficiency. A suitable molar ratio of complex metal catalyst (measured as moles of metal) to phenol is about 1:50 to about 1:400, with about 1:100 to about 1:200 being preferred.

The complex metal catalyst may, optionally, further include a halide ion such as chloride, bromide, or iodide. When employed, halide ions may be supplied to the reaction mixture in the form of an alkali metal salt or an alkaline earth metal salt at a concentration of about 0.1 mole to about 150 moles per 100 moles of phenolic monomer.

In a preferred embodiment, the complex metal catalyst comprises copper ion, a secondary alkylenediamine ligand, a secondary monoamine, and a tertiary monoamine. In a highly preferred embodiment, the complex metal catalyst comprises copper ion, N,N'-di-t-butylethylenediamine, di-n-butylamine, and dimethyl-n-butylamine.

The method may, optionally, further comprise recovering the complex metal catalyst with an aqueous solution. Many diverse extractants or chelating agents may be used to complex with the catalyst after the end of the polymerization reaction. For example, sulfuric acid, acetic acid, ammonium salts, bisulfate salts and various chelating agents may be used. When these materials are added to a poly(arylene ether) reaction solution, the complex metal catalyst becomes poisoned and further oxidation does not take place. Many different materials may be used but it is preferred to employ those chelating agents that are disclosed in U.S. Pat. No. 3,838,102 to Bennett et al. Useful chelating agents include polyfunctional carboxylic acid containing compounds, such as, for example, polyalkylenepolyamine polycarboxylic acids, aminopolycarboxylic acids, aminocarboxylic acids, aminopolycarboxylic acids, aminocarboxylic acids, polycarboxylic acids and their alkali metal, alkaline earth metal or mixed alkali metal-alkaline earth metal salts. Specific examples of chelating agents include, for example, sodium potassium tartrate, nitrilotriacetic acid (NTA), citric acid, glycine, ethylenediaminetetraacetic acid (EDTA), hydroxyethylenediaminetriacetic acid, diethylenetriaminepentaacetic acid, salts of the foregoing chelating agents, combinations comprising at least one of the foregoing chelating agents, and the like. Especially preferred chelating agents include ethylenediaminetetraacetic acid or a mono-, di-, tri- and tetrasodium salt thereof. The resulting copper complex can be referred to as a copper carboxylate complex.

The chelated metallic catalyst component may be extracted with the water produced in the polymerization reaction through the use of a liquid/liquid centrifuge. Alternatively, additional water may be added to the mixture to improve the mixing and extraction efficiency. In either case, the chelated metallic catalyst component dissolved in the water phase may be separated from the poly(arylene ether)/toluene solution by the use of a liquid/liquid centrifuge. The preferred extraction liquid is an aqueous solution of lower alkanol, for example, a mixture of water and an alkanol having from 1 to about 4 carbon atoms. Generally from about 1% to about 80% by volume of the alkanol may be employed, based on the total volume of the aqueous solution of lower alkanol. The volume ratio of the aqueous liquid extractant to discrete organic phase may vary from about 0.01:1 to about 10:1.

The reaction medium may comprise an aqueous environment. Anti-solvents can also be utilized in combination with the aqueous media to help drive the precipitation of the copper (I) species. The selection of an appropriate anti-solvent is based partially on the solubility coefficient of the copper (I) species that is being precipitated. The halides are highly insoluble in water, $\log(K_{sp})$ values at 25° C. are –4.49, –8.23, and –11.96 for CuCl, CuBr, and CuI, respectively. Solubility in water is increased by the presence of excess of halide ions due to the formation of, e.g., $CuCl^-$, $CuCl_3^{2-}$, and $CuCl_4^{3-}$, and by other complexing species. Examples of anti-solvents include low molecular weight aliphatic and aromatic hydrocarbons, ketones, alcohols, and the like, which in themselves would have some solubility in the aqueous solution. One skilled in the art would be able to select an appropriate type and amount of anti-solvent, if any was utilized.

The reaction temperature, $T_{rxn}$, temperature to carry out the polymerization stage (coupling) is generally about 0° C. to about 95° C., as long as the $T_{rxn}$ is above the cloud point, $T_{cloud}$. Determination of $T_{cloud}$ is described below. Within this range of reaction temperatures, it may be preferred to use a temperature of at least about ($T_{cloud}$+3° C.), more preferably at least about ($T_{cloud}$+5° C.), yet more preferably at least about ($T_{cloud}$+10° C.), still more preferably at least about ($T_{cloud}$+15° C.). At temperatures substantially higher than about 95° C., side reactions can occur leading to reaction by-products, and at temperatures substantially lower than about 0° C., ice crystals may form in the solution.

The cloud point, $T_{cloud}$, is a property of the reaction mixture. It corresponds to the temperature at which turbidity is first observed for a solution of a poly(arylene ether), and it is influenced by factors including the poly(arylene ether)'s monomer composition and intrinsic viscosity and concentration, as well as the identity of the solvent. A detailed procedure for determining a cloud point is provided below in Examples 1–26. For a given poly(arylene ether) dissolved in a given solvent, the $T_{cloud}$ value may be determined by preparing the solution in its homogeneous state and gradually decreasing the temperature until turbidity is first observed. By measuring $T_{cloud}$ for variations in poly(arylene ether) monomer composition, intrinsic viscosity, and concentration, it is possible to derive an equation relating $T_{cloud}$ to these variables for any poly(arylene ether)/solvent system.

Amine incorporation may occur at a position ortho to the hydroxyl moiety of a terminal phenyl group in a poly(arylene ether) chain. This is termed "external" amine, and it may include cyclized products such as, for example the product in which a ring is formed between an alkyl substituent on the amine group and the terminal oxygen of the poly(arylene ether) chain. A smaller quantity of "internal" amine group incorporation may also occur within the resin chain. Amine incorporation used herein includes the combination of both internal and external amines unless otherwise specified. The amount of amine incorporation may be expressed as a weight percent, based on the total weight of the poly(arylene ether) resin, where the weight of the amine includes any substituent directly bound to the amine nitrogen and derived from the catalyst amine rather than the poly(arylene ether) chain. For example, a poly (arylene ether) having the structure would have an incorporated amine content of $$\frac{128.24}{30,287}(100) = 0.42\%$$

where 128.24 grams/mole is the weight of the dibutylamine substituent and 30,287 gram/mole is the total weight of the poly(arylene ether) molecule. In practice, the extent of amine incorporation may be determined using the $^{13}$C NMR methods described in the White and Nye article, cited above, as well as the $^{13}$C NMR and $^{31}$P NMR techniques described in K. P. Chan, D. S. Argyropoulos, D. M. White, G. W. Yeager, and A. S. Hay, *Macromolecules* (1994), volume 27, pages 6371–6375.

In one embodiment, the amount of amine incorporation in the poly(arylene ether) may be about 0.30 to about 2.0 weight percent based on the total weight of the resin. Within this range, it may be preferred to have at least about 0.40 weight percent, more preferably at least about 0.50 weight percent incorporated amine based on the total weight of the resin. Also within this range, it may be preferred to have up to about 1.0 weight percent, more preferably up to about 0.70 weight percent, incorporated amine based on the total weight of the resin.

In addition to the incorporation of amine into the poly(arylene ether) resin, other materials may be incorporated during the poly(arylene ether) process. For example, during the production of poly(2,6-dimethyl-1,4-phenylene ether) (hereinafter "PPE") a side reaction may occur resulting in the formation of 3,3',5,5'-tetramethyl-4,4'-diphenoquinone (hereinafter "TMDQ"). This side product may be incorporated into the PPO in its reduced form as shown below It has been posited that the presence of TMDQ in the reaction mixture may result in a redistribution reaction that relocates external amine groups to positions within the resin to form internal amine groups. See *Macromolecules* (1990), vol.23, no. 5, page 1324.

In one embodiment, the amount of TMDQ incorporation in the poly(arylene ether) may be about 0.30 to about 2.0 weight percent based on the total weight of the resin. Within this range, it may be preferred to have at least about 0.40 weight percent, more preferably at least about 0.50 weight percent incorporated TMDQ based on the total weight of the resin. Also within this range, it may be preferred to have up to about 1.5 weight percent, more preferably up to about 1.0 weight percent incorporated TMDQ based on the total weight of the resin.

The intrinsic viscosity of the poly(arylene ether) formed by the method may be about 0.05 dL/g to about 2.0 dL/g. Within this range, it may be preferred to use a poly(arylene ether) having an intrinsic viscosity of at least about 0.1 dL/g, more preferably at least about 0.2 dL/g, yet more preferably at least about 0.25 dL/g, still more preferably at least about 0.30 dL/g, as measured in chloroform at 25° C. Also within this range, the poly(arylene ether) may have an intrinsic viscosity of up to about 1.6 dL/g, more preferably up to about 1.0 dL/g, still more preferably up to about 0.5 dL/g, and even more preferably up to about 0.45 dL/g.

In one embodiment of the method that is particularly suitable for large-scale manufacturing of the poly(arylene ether), the total monomer concentration in the reaction mixture may be at least about 15 weight percent, preferably at least about 20 weight percent, more preferably at least about 23 weight percent, based on the total weight of the reaction mixture.

The process and reaction conditions for the polymerization, such as reaction time, oxygen flow rate, and the like may be modified based on the target molecular weight and monomer composition. The endpoint of the polymerization may conveniently be determined with an in-line viscosity meter. Other methods such as making molecular weight measurements, running to a predetermined reaction time, controlling to a specified end group concentration, or the oxygen concentration in solution may also be utilized.

The method may further comprise precipitation of the poly(arylene ether) by adding an anti-solvent to the reaction mixture or concentrating the reaction mixture and then adding an anti-solvent. This concentration step, sometimes referred to as pre-concentration, may, for example, be conducted after removal of the complex metal catalyst. The pre-concentration step may preferably produce a concentrated solution having about 20 to about 60 weight percent of the poly(arylene ether). Determining the desired poly(arylene ether) weight percent will depend on the solvent, as well as the monomer composition and intrinsic viscosity of the poly(arylene ether).

Any suitable method for pre-concentration may be employed. For example, the pre-concentration may be carried out by preheating the solution above its atmospheric boiling point at a pressure modestly elevated above one atmosphere (so that no boiling takes place in the heat exchanger) followed by flashing the solution to a lower pressure and temperature, whereby vaporization of a substantial part of the solvent takes place and the required heat of vaporization is supplied by the heat transferred in the heat exchanger as sensible heat of the solution.

Suitable anti-solvents include lower alkanols having one to about eight carbon atoms, such as methanol, and the like; ketones having three to about ten carbon atoms, such as acetone, and the like; and alkanes having five to about ten carbon atoms, such as hexane; and the like; and combinations comprising at least one of the foregoing anti-solvents. A preferred anti-solvent comprises methanol. A highly preferred anti-solvent comprises about 70 to 100 weight percent methanol, 0 to about 20 weight percent toluene, and 0 to about 10 weight percent water. The anti-solvent may be employed at a range of amounts relative to the amount of the organic solvent, with the optimum amount depending on the identities of the organic solvent and anti-solvent, as well as the concentration, intrinsic viscosity, and monomer composition of the poly(arylene ether) product. For example, when the poly(arylene ether) is a random copolymer having an intrinsic viscosity of 0.36 dL/g and a composition of 82 weight percent 2,6-dimethyl-1,4-phenylene ether units and 18 weight percent 2,3,6-dimethyl-1,4-phenylene ether units, the organic solvent is toluene, and the anti-solvent is methanol, a toluene:methanol weight ratio of about 1:1.5 to about 1:5 may be suitable.

The method may, optionally, further comprise isolation of the precipitated poly (arylene ether) using any conventional filtration or solid/liquid separation technique. Suitable filtration apparatuses include rotating filters, continuous rotary vacuum filters, continuous moving bed filters, batch filters, and the like. Suitable solid/liquid separation apparatuses include continuous solid/liquid centrifuges. It should be noted that solutions of the homopolymer poly(2,6-dimethyl-1,4-phenylene ether) in aromatic solvents such as toluene typically do not exhibit a cloud point. Rather, as such solutions of poly(2,6-dimethyl-1,4-phenylene ether) are concentrated, they may form a gelatinous phase without the discrete solid particles characteristic of a cloud point.

The method may, optionally, further comprise washing of the filtered poly(arylene ether). Washing may be performed, for example, with additional anti-solvent directly on the filter or by mixing the "powder wetcake" from the filter or solid/liquid separation apparatus with additional anti-solvent in a stirred tank. A preferred method of washing the filtered poly(arylene ether) uses a two-stage reslurry and solid/liquid separation process scheme. In this embodiment, the wetcake from the filter may be washed with anti-solvent in a stirred tank; the poly(arylene ether)/solvent/anti-solvent mixture may then be separated in a solid/liquid continuous centrifuge and the poly(arylene ether) wetcake from the centrifuge may be mixed a second time with anti-solvent in a continuous stirred tank, followed by a second solid/liquid separation in a second solid/liquid centrifuge.

One embodiment provides a method of preparing a poly (arylene ether), comprising oxidatively coupling 2,6-dimethylphenol and 2,3,6-trimethylphenol at a reaction temperature, $T_{rxn}$, using an oxygen-containing gas in the presence of toluene and a complex copper catalyst comprising di-n-butylamine to produce a reaction mixture comprising a poly(arylene ether) copolymer resin; wherein the weight ratio of 2,6-dimethylphenol to 2,3,6-trimethylphenol is about 3:1 to about 6:1; wherein the reaction mixture has a cloud point, $T_{cloud}$; and wherein $T_{rxn}$ is greater than $T_{cloud}$.

Another embodiment provides a method of preparing a poly(arylene ether), comprising oxidatively coupling 2,6-dimethylphenol and 2,3,6-trimethylphenol using an oxygen-containing gas in the presence of toluene and a complex copper catalyst comprising di-n-butylamine to produce a reaction mixture comprising a poly(arylene ether) copolymer resin having an incorporated amine content of about 0.4 weight percent to about 2 weight percent based on the total weight of the resin; wherein the weight ratio of 2,6-dimethylphenol to 2,3,6-trimethylphenol is about 3:1 to about 6:1; wherein the oxidative coupling comprises an exothermic phase and an endothermic phase; and wherein coupling comprises heating at a temperature of at least about 45° C. during the endothermic phase.

Yet another embodiment provides a method of preparing a poly(arylene ether), comprising oxidatively coupling 2,6-dimethylphenol and 2,3,6-trimethylphenol at a reaction temperature, $T_{rxn}$, using an oxygen-containing gas in the presence of toluene and a complex copper catalyst to produce a reaction mixture comprising a poly(arylene ether) copolymer resin; wherein $T_{rxn}$ satisfies the inequality $$T_{rxn} > \left( \frac{\phi_s - (0.296 \times IV + 1.27 \times TMP - 35.7)}{1.97(1 - 0.00795 \times IV - 0.0249 \times TMP)} \right)$$

where $\phi_s$ is the copolymer concentration (expressed in weight percent), IV is the intrinsic viscosity of the copolymer in chloroform at 25° C. (expressed in mL/g), and TMP is the 2,3,6-trimethylphenol content of the copolymer (expressed in weight percent).

The invention is further illustrated by the following non-limiting examples.

EXAMPLE 1

This example illustrates the synthesis and isolation of a poly(arylene ether) copolymer having 18 weight percent of repeating units derived from 2,3,6-trimethylphenol and 82 weight percent of units derived from 2,6-dimethylphenol. In a reactor were combined cuprous oxide ($Cu_2O$; 0.027 kg, obtained from American Chemet as purple copper) dissolved in hydrobromic acid (0.423 kg as 48% aqueous solution, CAS Reg. No.10035-10-6, obtained from Great Lakes), N,N'-di-t-butylethylenediamine (0.119 kg, DBEDA, CAS Reg. No. 4062-60-6 obtained from Celanese), di-n-butylamine (1.616 kg, DBA, CAS Reg. No. 111-92-2, obtained from Celanese), N,N-dimethylbutylamine (2.675 kg, DMBA, CAS Reg. No. 927-62-8, obtained from Celanese), a tetraalkylammonium chloride surfactant (0.059 kg, CAS Reg. No. 5137-55-3, obtained from Cognis as Aliquat), 2,6-dimethylphenol (5.361 kg) and toluene solvent (140.06 kg). Over the course of the polymerization reaction, additional 2,6-dimethylphenol (30.377 kg) was added, along with 2,3,6-trimethylphenol (7.845 kg). During the polymerization, the nitrogen flow rate was 61.3 liters/minute, the oxygen flow rate was 46.2 liters/minute, and the temperature increased gradually from 29.4° C. to 55.0° C. After the completion of the polymerization reaction, the copper catalyst was separated from the polymer by mixing the reactor effluent with an aqueous solution of nitrilotriacetic acid (0.871 kg as a 60% solution in water, CAS Reg. No. 139-13-9, obtained from Solutia). The two-phase solution was separated using a liquid-liquid centrifuge. The polymer phase was concentrated to 38 weight percent polymer by flashing toluene at atmospheric pressure. The product copolymer was precipitated from the concentrated polymer solution by combining the solution (at 88° C.) in a stirred tank vessel with methanol (at 15° C.) at 1:2 weight/weight ratio of polymer solution:methanol. The resulting slurry was passed through a rotary vacuum filter and the wetcake was re-slurried with methanol. This slurry was centrifuged and the separated solid particles were dried in a rotary paddle dryer.

EXAMPLES 2–26

These examples illustrate the determination of cloud points for toluene solutions of poly(2,6-dimethyl- 1,4-phenylene ether-co-2,3,6-trimethyl-1,4-phenylene ether) as a function of copolymer concentration, copolymer intrinsic viscosity, and copolymer composition. Copolymers having intrinsic viscosities of 35.3 mL/g to 41.6 mL/g, and 15, 18, and 21 weight percent of units derived from 2,3,6-trimethylphenol (TMP) were synthesized according to the procedure of Example 1. For a given copolymer solubility determination, an isolated poly(arylene ether) copolymer was dissolved at 10 to 30 weight percent in toluene at 90° C. The temperature of the solution was decreased at a rate of about 1° C. per minute and the temperature at which the first turbidity was observed was recorded as the cloud point, $T_{cloud}$. Results are presented in Table 1.

TABLE 1

| | copolymer TMP content (wt %) | I.V. (mL/g) | copolymer concentration (wt %) | observed $T_{cloud}$ (° C.) |
|---|---|---|---|---|
| Ex. 2 | 15 | 35.3 | 10 | 21.5 |
| Ex. 3 | 15 | 35.3 | 15 | 33.0 |
| Ex. 4 | 15 | 35.3 | 20 | 38.5 |
| Ex. 5 | 15 | 35.3 | 25 | 47.0 |
| Ex. 6 | 15 | 35.3 | 30 | 55.0 |
| Ex. 7 | 18 | 35.3 | 10 | 30.5 |
| Ex. 8 | 18 | 35.3 | 15 | 36.0 |
| Ex. 9 | 18 | 35.3 | 20 | 41.5 |
| Ex. 10 | 18 | 35.3 | 25 | 46.0 |
| Ex. 11 | 18 | 35.3 | 30 | 54.0 |
| Ex. 12 | 18 | 41.0 | 10 | 32.0 |
| Ex. 13 | 18 | 41.0 | 15 | 38.0 |
| Ex. 14 | 18 | 41.0 | 20 | 43.5 |
| Ex. 15 | 18 | 41.0 | 25 | 50.0 |
| Ex. 16 | 18 | 41.0 | 30 | 62.5 |
| Ex. 17 | 21 | 35.8 | 10 | 35.0 |
| Ex. 18 | 21 | 35.8 | 15 | 39.5 |
| Ex. 19 | 21 | 35.8 | 20 | 46.0 |
| Ex. 20 | 21 | 35.8 | 25 | 52.0 |
| Ex. 21 | 21 | 35.8 | 30 | 82.0 |
| Ex. 22 | 21 | 41.6 | 10 | 35.5 |
| Ex. 23 | 21 | 41.6 | 15 | 41.5 |
| Ex. 24 | 21 | 41.6 | 20 | 49.0 |
| Ex. 25 | 21 | 41.6 | 25 | 95.0 |
| Ex. 26 | 21 | 41.6 | 30 | 99.0 |

Using linear regression techniques, the data were used to generate the equation (I):

$$\phi_s = (0.30\pm0.15)IV + (1.27\pm0.31)TMP - (35.7\pm6.1) + (1.97\pm0.41)T_{cloud}(1-(0.0080\pm0.0013)IV - (0.0249\pm0.0026)*TMP) \quad (1)$$

where $\phi_s$ is the copolymer concentration (expressed in weight percent), IV is the copolymer intrinsic viscosity in chloroform at 25° C. (expressed in mL/g), TMP is weight percent of units derived from TMP in the copolymer (expressed in weight percent), and $T_{cloud}$ is the cloud point (expressed in °C.). Uncertainties expressed for each coefficient and the intercept represent 95% confidence intervals. Equation (I) can be solved for $T_{cloud}$ to generate equation (II):

$$T_{cloud} = [\phi_s - (0.296IV \pm 1.27TMP - 35.7)]/[1.97(1 - 0.00795IV - 0.0249TMP)] \quad (II)$$

These examples demonstrate the use of controlled variations in copolymer TMP content, intrinsic viscosity, and solution concentration to generate an equation to predict cloud point as a function of these variables. Although this example uses toluene as the solvent, the method may be applied to solutions in other solvents.

EXAMPLES 27 AND 28, COMPARATIVE EXAMPLES 1 AND 2

These examples show the effect of reaction temperature versus time on the amount of incorporated amine. All examples and comparative examples were prepared by procedures similar to that detailed in Example 1. Data presented for Example 27 represent an average of 25 pilot plant batches. In Example 27, copolymers were prepared from 82 weight percent 2,6-dimethylphenol and 18 weight percent 2,3,6-trimethylphenol in a 190 liter pilot scale reactor using the reaction temperature profile indicated by a solid line in FIG. 1 and labeled "Ex. 27". As in Example 1, the 2,6-dimethylphenol and 2,3,6-trimethylphenol collectively represented 23.1 weight percent of the total reaction mixture for Example 27. The product copolymer had an intrinsic viscosity of about 0.40 dL/g, a TMP content of about 18 weight percent, and a concentration in the reaction mixture of about 23 weight percent. Using the equation for $T_{cloud}$ derived in Examples 2–26, the reaction mixture would be expected to have a cloud point temperature of about 52.0° C. (125.6° F.).

Figure 1:
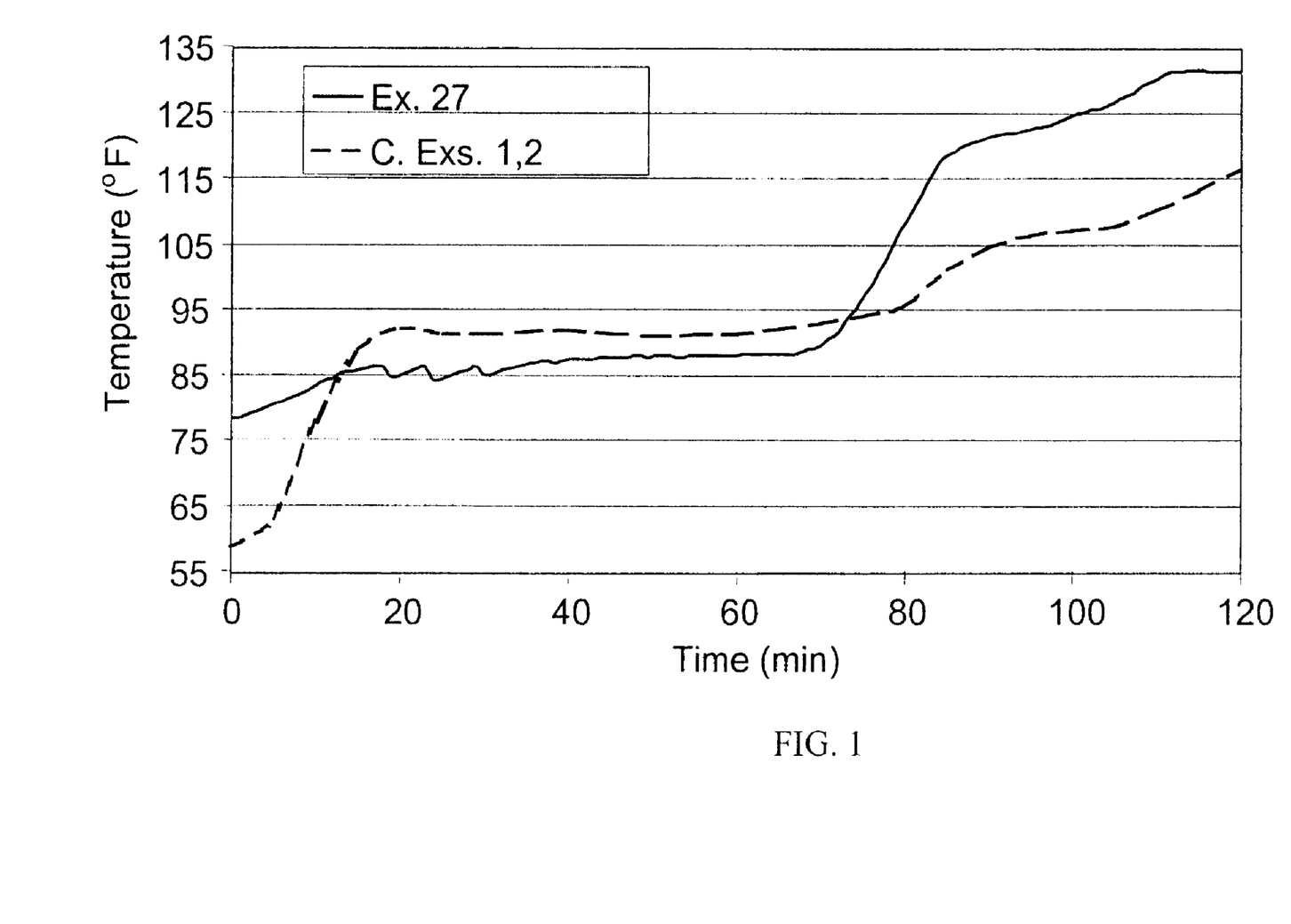
FIG. 1 is a graph of temperature versus time profiles for poly(arylene ether) copolymer reaction mixtures corresponding to Example 27 and Comparative Examples 1 and 2.

Comparative Examples 1 and 2 were prepared by a procedure similar to that used for Example 27, except that Comparative Examples 1 and 2 were prepared in a 19,000 liter manufacturing scale reactor and used the reaction temperature profile indicated by a dashed line in FIG. 1 and labeled "Comp. Exs. 1,2". Note that Comparative Examples 1 and 2 produced a poly(arylene ether) copolymer having nominally the same intrinsic viscosity, TMP content, and concentration as the copolymers produced by Example 27, so the cloud point temperature was expected to about 52.0° C. (125.6° F.).

As mentioned above, FIG. 1 is a graph of reaction temperature versus time for Example 27 (solid line) and Comparative Examples 1 and 2 (dashed line). For both lines, the plateau observed between about 30 and 70 minutes represents the exothermic phase of the process, where heat is produced by the reaction and the reaction mixture temperature is maintained using a chiller system. Dimers and trimers are believed to be formed in this exothermic phase. The exothermic phase is followed by a polymerization phase or "build phase", where the reaction is heated to gradually increase the reaction mixture temperature. It is during the build phase that the intrinsic viscosity of the resin is increased and a substantial amount of amine is incorporated into the poly(phenylene ether) resin. The temperature profile for Example 27 includes a higher build phase temperature than the temperature profile for Comparative Examples 1 and 2. In particular, at the end of temperature profile for Example 27, the reaction temperature exceeds the predicted cloud point of 125.6° F., whereas the reaction temperature for Comparative Examples 1 and 2 remains at least 10° F. below the predicted cloud point temperature.

Properties of the poly(arylene ether) resins are provided in Table 2. Percent TMP incorporated, percent TMDQ incorporated, and percent external and percent internal amine incorporated were all determined by proton nuclear magnetic resonance spectroscopy ($^1$H NMR). The results show that the copolymers of Example 27 have incorporated amine concentrations much higher than those of the copolymers of Comparative Examples 1 and 2.

Figure 2:
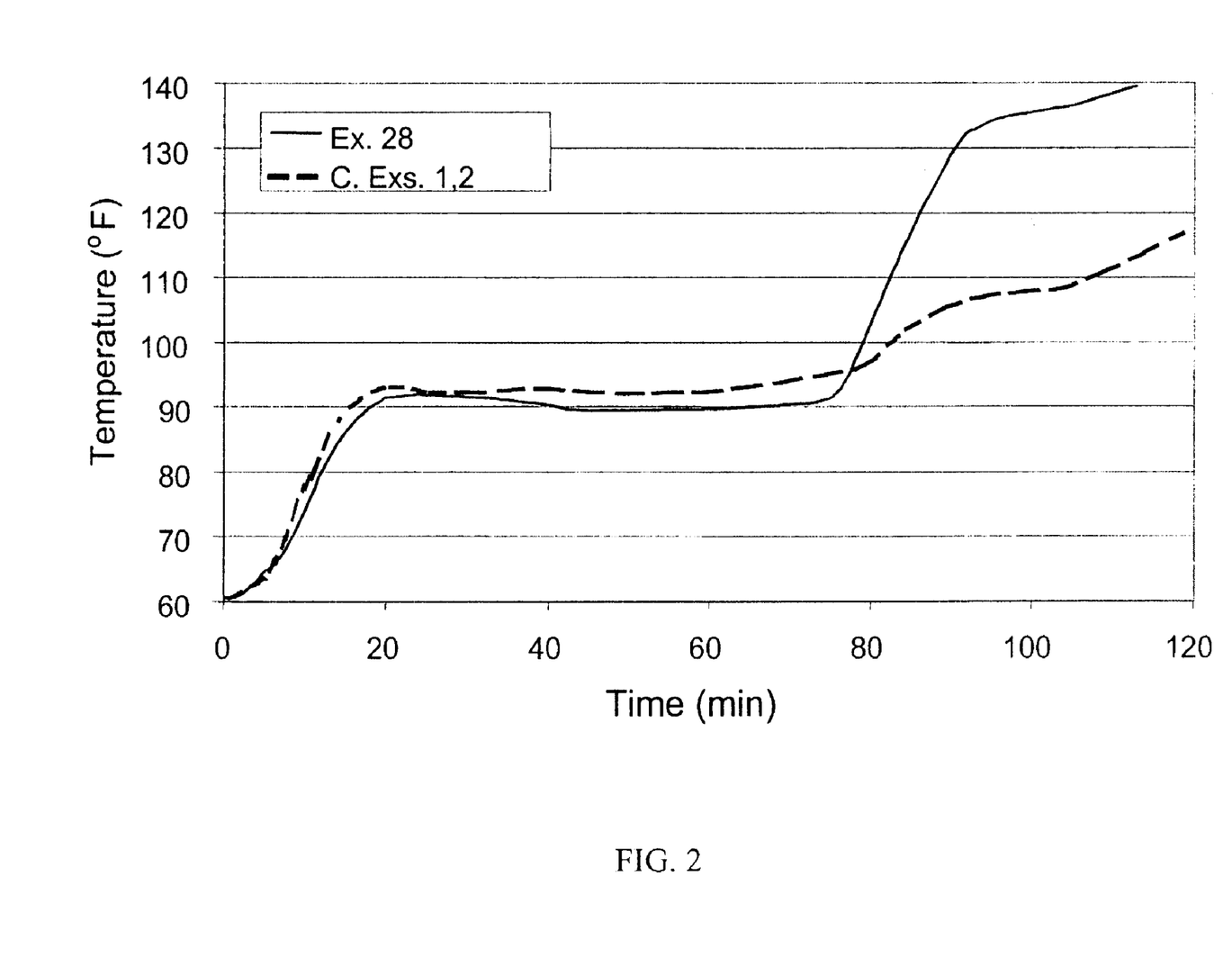
FIG. 2 is a graph of temperature versus time profiles for poly(arylene ether) copolymer reaction mixtures corresponding to Example 28 and Comparative Examples 1 and 2.

Example 28 was run on the manufacturing scale (19,000 L reactor) using the temperature profile shown in FIG. 2, which was similar to that used for Example 27 and is significantly higher during the build phase than the temperature profile for Comparative Examples 1 and 2. A poly (arylene ether) copolymer having an intrinsic viscosity of 0.41 dL/g was obtained. Other properties of the copolymer are presented in Table 2. The results are very similar to those for Example 27, indicating that the advantages of the invention can be obtained on both pilot and manufacturing scales. Examples 27 and 28 collectively show that maintaining a reaction temperature above the cloud point temperature of the reaction mixture enables the production of a poly (arylene ether) having a high amine content.

TABLE 2

| | Ex. 27 | Ex. 28 | C. Ex. 1 | C. Ex. 2 |
|---|---|---|---|---|
| % TMP incorporated | 17.8 | 18.1 | 17.4 | 17.5 |
| % TMDQ incorporated | 0.67 | 0.71 | 0.65 | 0.66 |
| % external amine incorporated | 0.62 | 0.63 | 0.33 | 0.38 |
| % internal amine incorporated | 0.15 | 0.17 | 0.02 | 0.02 |

EXAMPLES 29 AND 30, COMPARATIVE EXAMPLES 3–6

These examples and comparative examples demonstrate the effect on amine incorporation of varying the reaction temperature during the build phase. Poly(arylene ether) copolymers were prepared using a procedure similar to that in Example 1. In each Example, the monohydric phenol consisted of 82 weight percent 2,6-dimethylphenol and 18 weight percent 2,3,6-trimethylphenol, and the reaction mixture contained 23.7 weight percent solids. The reaction temperature versus time profile used to prepare each copolymer is given in Table 3. The product copolymers had a TMP content of about 18 weight percent, and a concentration in the reaction mixture of about 23 weight percent. Table 4 shows various copolymer properties as a function of the reaction temperature profile. The "EPM-pressure" corresponds to the measured pressure drop across a recycle loop of the reactor. The EPM-pressure is an in-line monitoring tool that is related to the polymer intrinsic viscosity, and it enables the reactor operator to stop the reaction once the desired poly(arylene ether) intrinsic viscosity is reached. In other words, EPM-pressure is a monitoring tool that enables the manufacture over time of a polymer with a uniform intrinsic viscosity. Precipitation of the polymer during reaction affects the relationship between the EPM-pressure and the polymer intrinsic viscosity, resulting in a failure of EPM-pressure to accurately predict polymer intrinsic viscosity. This adversely affects the consistency of the product intrinsic viscosity. One advantage of the invention is that use of reaction temperatures according to the invention enable reliable prediction of intrinsic viscosity using the EPM-pressure. Incorporation of dibutylamine ("DBA incorp.") corresponds to external dibutylamine, determined as described above. Visual inspection was used to determine whether particles were present in the reaction mixture. For each Example, the reaction time designated EOR corresponds to the interpolated time at which the target intrinsic viscosity of 0.40 dL/g is reached. As noted above, a cloud point temperature of 52.0° C. (125.6° F.) is predicted for a copolymer having an intrinsic viscosity of about 0.40 dL/g, a TMP content of about 18 weight percent, and a concentration in the reaction mixture of 23 weight percent. Examples 29 and 30 were run under the same conditions and had end of the reaction temperatures of 54.41° C. and 54.16° C., respectively. The resulting resins contained excellent quantities of incorporated amine (0.673 and 0.636 weight percent, respectively). Additionally, very little resin precipitated out of the reaction mixture as shown by the absence of visually observed particles. Reactions run at lower temperatures did not exhibit high levels of amine incorporation. As the end or reaction temperature of the reaction mixture was lowered to 51.17° C. (Comparative Example 3), 47.94° C. (Comparative Example 5), 47.88° C. (Comparative Example 4) and 43.36° C. (Comparative Example 6), the amount of incorporated amine decreases accordingly. While not wishing to be bound by any particular hypothesis, the inventors believe that when the reaction temperature falls below the cloud point temperature, the resin precipitates out of the reaction mixture before the amine groups can be incorporated in desired quantities.

TABLE 3

| | Rxn. time (min.) | Rxn. temp. (° C.) |
|---|---|---|
| Ex. 29 | 1 | 26.21 |
| | 15 | 32.25 |
| | 30 | 33.23 |
| | 45 | 31.82 |
| | 70 | 31.82 |
| | 75 | 34.57 |
| | 105 | 54.59 |
| | EOR | 54.41 |
| Ex. 30 | 1 | 25.42 |
| | 15 | 31.40 |
| | 30 | 32.98 |
| | 45 | 31.70 |
| | 70 | 31.82 |
| | 75 | 34.63 |
| | 105 | 54.53 |
| | EOR | 54.16 |
| C. Ex. 3 | 1 | 25.35 |
| | 15 | 31.95 |
| | 30 | 33.11 |
| | 45 | 31.82 |
| | 70 | 31.95 |
| | 75 | 35.00 |
| | 105 | 51.60 |
| | EOR | 51.17 |
| C. Ex. 4 | 1 | 26.33 |
| | 15 | 32.68 |
| | 30 | 33.23 |
| | 45 | 32.25 |
| | 70 | 32.01 |
| | 75 | 34.08 |
| | 105 | 48.12 |
| | EOR | 47.94 |
| C. Ex. 5 | 1 | 25.60 |
| | 15 | 31.70 |
| | 30 | 32.23 |
| | 45 | 32.25 |
| | 70 | 31.95 |
| | 75 | 35.06 |
| | 105 | 47.94 |
| | EOR | 47.88 |
| C. Ex. 6 | 1 | 25.84 |
| | 15 | 32.31 |
| | 30 | 33.17 |
| | 45 | 31.95 |
| | 70 | 31.88 |
| | 75 | 34.75 |
| | 105 | 44.52 |
| | EOR | 43.36 |

TABLE 4

| | End of Rxn. Temp (° C.) | Rxn time (min.) | IV (dl/g) | DBA incorp. (wt. %) | TMDQ incorp. (wt %) | EPM-pressure (bar) | Temp. (° C.) | Particles Observed? |
|---|---|---|---|---|---|---|---|---|
| Ex. 29 | 54.41 | 80 | 0.107 | — | — | — | — | — |
| | | 85 | 0.141 | — | — | — | — | — |
| | | 90 | 0.209 | 0.372 | 0.42 | 0.38 | 54.5 | no |
| | | 95 | 0.269 | 0.528 | 0.45 | 0.81 | 54.8 | no |
| | | 100 | 0.334 | 0.585 | 0.49 | 1.56 | 54.7 | no |
| | | 105 | 0.373 | 0.678 | 0.44 | 2.40 | 54.6 | no |
| | | 110 | 0.397 | 0.667 | 0.53 | 2.82 | 54.5 | no |
| | | 115 | 0.434 | 0.673 | 0.59 | 3.15 | 54.4 | no |
| Ex. 30 | 54.16 | 80 | 0.102 | — | — | — | — | — |
| | | 85.5 | 0.142 | — | — | — | — | — |
| | | 90.5 | 0.21 | 0.408 | 0.48 | 0.38 | 54.8 | no |
| | | 95 | 0.261 | 0.505 | 0.54 | 0.73 | 54.9 | no |
| | | 100 | 0.305 | 0.601 | 0.62 | 1.38 | 54.6 | no |
| | | 105.2 | 0.354 | 0.640 | 0.67 | 2.31 | 54.5 | no |
| | | 111 | 0.388 | 0.636 | 0.72 | 2.86 | 54.4 | no |
| | | 115 | 0.406 | 0.636 | 0.74 | 3.13 | 54.4 | no |
| | | 120 | — | — | — | 3.55 | 54.2 | yes at 117 min. |
| C. Ex. 3 | 51.17 | 90 | 0.210 | — | — | 0.27 | 52.8 | no |
| | | 95 | — | — | — | 0.44 | 52.5 | no |
| | | 100 | 0.298 | 0.538 | 0.39 | 0.94 | 51.9 | no |
| | | 105 | 0.342 | 0.626 | 0.41 | 1.90 | 51.6 | no |
| | | 110 | 0.367 | 0.6615 | 0.60 | 2.59 | 51.5 | yes |
| | | 115 | 0.388 | 0.6675 | 0.68 | 2.80 | 51.3 | yes |
| | | 120 | 0.410 | — | — | 2.87 | 51.2 | yes |
| C. Ex. 4 | 47.94 | 90 | 0.210 | — | — | — | — | — |
| | | 100 | 0.352 | 0.459 | 0.50 | 2.16 | 48.2 | yes |
| | | 101.5 | 0.386 | 0.462 | 0.49 | 2.26 | 48.2 | yes |
| | | 105 | 0.411 | 0.4705 | 0.53 | 2.34 | 48.1 | yes |
| C. Ex. 5 | 47.88 | 90 | 0.210 | — | — | — | — | — |
| | | 100 | 0.386 | 0.496 | 0.45 | 1.98 | 48.2 | yes |
| | | 102.5 | 0.419 | 0.498 | 0.44 | 2.10 | 48.1 | yes |
| | | 105.5 | 0.424 | 0.511 | 0.45 | 2.10 | 47.9 | yes |
| C. Ex. 6 | 43.36 | 90 | 0.200 | 0.330 | 0.41 | 0.40 | 45.7 | no |
| | | 95 | 0.264 | 0.443 | 0.45 | 0.96 | 45 | yes at 97 min. |
| | | 100 | 0.356 | 0.464 | 0.54 | 1.38 | 44.6 | yes |
| | | 105 | 0.421 | 0.468 | 0.53 | 1.66 | 44.5 | yes |
| | | 110 | 0.469 | 0.453 | 0.51 | 1.89 | 44 | yes |
| | | 115 | 0.476 | 0.439 | 0.57 | 2.05 | 43.8 | yes |
| | | 120 | 0.493 | 0.422 | 0.44 | 2.23 | 4.3.5 | yes |
| | | 125 | 0.508 | 0.467 | 0.50 | 2.37 | 43.4 | yes |

In summary, the examples and comparative examples show that poly(arylene ether) resins with increased content of incorporated amine are obtained when the reaction temperature is maintained above the cloud point temperature.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents and other references are incorporated herein by reference in their entirety.

What is claimed is:

1. A method of preparing a poly(arylene ether), comprising:

oxidatively coupling a monohydric phenol at a reaction temperature, $T_{rxn}$, using an oxygen-containing gas in the presence of a solvent and a complex metal catalyst to produce a reaction mixture comprising a poly(arylene ether) resin;

wherein the reaction mixture has a cloud point, $T_{cloud}$; and wherein $T_{rxn}$ is greater than $T_{cloud}$.

2. The method of claim 1, wherein the monohydric phenol comprises a monohydric phenol having the formula:

wherein each $Q^1$ is independently selected from the group consisting of halogen, $C_1$–$C_7$ primary or secondary alkyl, phenyl, $C_1$–$C_7$ haloalkyl, $C_1$–$C_7$ aminoalkyl, $C_1$–$C_7$ hydrocarbonoxy, and $C_2$–$C_7$ halohydrocarbonoxy wherein at least two carbon atoms separate the halogen and oxygen atoms; and each $Q^2$ is independently selected from the group consisting of hydrogen, halogen, $C_1$–$C_7$ primary or secondary alkyl, phenyl, $C_1$–$C_7$ haloalkyl, $C_1$–$C_7$ hydrocarbonoxy, and $C_2$–$C_7$ halohydrocarbonoxy wherein at least two carbon atoms separate the halogen and oxygen atoms.

3. The method of claim 1, wherein the monohydric phenol comprises 2,6-dimethylphenol and 2,3,6-trimethylphenol.

4. The method of claim 1, wherein the monohydric phenol comprises 2,6-dimethylphenol and 2,3,6-trimethylphenol in a weight ratio of about 1:1 to about 20:1.

5. The method of claim 1, wherein the solvent comprises a $C_6$–$C_{18}$ aromatic hydrocarbon.

6. The method of claim 5, wherein the solvent further comprises a $C_3$–$C_8$ aliphatic alcohol.

7. The method of claim 5, wherein the solvent further comprises methanol, ethanol, or a mixture comprising at least one of the foregoing solvents.

8. The method of claim 1, wherein the complex metal catalyst comprises a metal ion from Group VIB, Group VIIB, or Group IB of the periodic table.

9. The method of claim 1, wherein the complex metal catalyst comprises chromium, manganese, cobalt, copper, or a combination comprising at least one of the foregoing metals.

10. The method of claim 1, wherein the complex metal catalyst comprises an alkylenediamine ligand having the formula $(R^b)_2N—R^a—N(R^b)_2$ wherein $R^a$ is a substituted or unsubstituted divalent residue wherein two or three aliphatic carbon atoms form the closest link between the two diamine nitrogen atoms; and each $R^b$ is independently hydrogen or $C_1$–$C_8$ alkyl.

11. The method of claim 10, wherein each $R^a$ is ethylene or trimethylene, and each $R^b$ is independently hydrogen, isopropyl, or a $C_4$–$C_8$ alpha-tertiary alkyl group.

12. The method of claim 10, wherein the alkylenediamine ligand is N,N,N',N'-tetramethyl-1,3-diaminopropane.

13. The method of claim 10, wherein the alkylenediamine ligand is N,N'-di-t-butylethylenediamine.

14. The method of claim 1, wherein the complex metal catalyst comprises a $C_4$–$C_{12}$ secondary monoamine.

15. The method of claim 14, wherein the secondary monoamine comprises di-n-butylamine.

16. The method of claim 1, wherein the complex metal catalyst comprises a $C_4$–$C_{12}$ aminoalcohol, wherein at least two carbon atoms separate the amino nitrogen and the alcohol oxygen.

17. The method of claim 16, wherein the aminoalcohol is triethanolamine or N-phenyl-ethanolamine.

18. The method of claim 1, wherein the complex metal catalyst comprises an oxine having the formula wherein $R^1$–$R^6$ are each independently selected from the group consisting of hydrogen, halogen, hydroxyl, nitro, amino, $C_1$–$C_6$ alkyl, and $C_1$–$C_6$ alkoxyl.

19. The method of claim 1, wherein the complex metal catalyst comprises a tertiary monoamine having the structure $(R^e)(R^f)(R^g)N$, wherein $R^e$ and $R^f$ and $R^g$ are each independently a $C_1$–$C_{16}$ alkyl group, with the proviso that $R^e$ and $R^f$ and $R^g$ collectively have a total of four to eighteen carbon atoms.

20. The method of claim 19, wherein the tertiary monoamine comprises dimethyl-n-butylamine.

21. The method of claim 1, wherein the complex metal catalyst comprises a $C_3$–$C_{12}$ primary alkylamine.

22. The method of claim 21, wherein the primary alkylamine is n-butylamine.

23. The method of claim 1, wherein the poly(arylene ether) resin comprises an incorporated amine content of at least about 0.35 weight percent based on the total weight of the resin.

24. The method of claim 1, wherein the poly(arylene ether) resin has an intrinsic viscosity of about 0.05 to about 2.0 deciliters/gram in chloroform at 25° C.

25. The method of claim 1, wherein the reaction mixture contains a total monomer concentration of at least about 15 weight percent.

26. A method of preparing a poly(arylene ether), comprising:

oxidatively coupling 2,6-dimethylphenol and 2,3,6-trimethylphenol at a reaction temperature, $T_{rxn}$, using an oxygen-containing gas in the presence of toluene and a complex copper catalyst comprising di-n-butylamine to produce a reaction mixture comprising a poly(arylene ether) copolymer resin; wherein the weight ratio of 2,6-dimethylphenol to 2,3,6-trimethylphenol is about 3:1 to about 6:1;

wherein the reaction mixture has a cloud point, $T_{cloud}$; and wherein $T_{rxn}$ is greater than $T_{cloud}$.

27. The method of claim 26, wherein the poly(arylene ether) copolymer resin comprises an incorporated amine content of at least about 0.35 weight percent based on the total weight of the resin.

28. The method of claim 26, wherein the poly(arylene ether) copolymer resin comprises an incorporated amine content of at least about 0.4 weight percent to about 2 weight percent based on the total weight of the resin.

29. A method of preparing a poly(arylene ether), comprising:

oxidatively coupling 2,6-dimethylphenol and 2,3,6-trimethylphenol using an oxygen-containing gas in the presence of toluene and a complex copper catalyst comprising di-n-butylamine to produce a reaction mixture comprising a poly(arylene ether) copolymer resin having an incorporated amine content of about 0.4 weight percent to about 2 weight percent based on the total weight of the resin; wherein the weight ratio of 2,6-dimethylphenol to 2,3,6-trimethylphenol is about 3:1 to about 6:1;

wherein the oxidative coupling comprises an exothermic phase and an endothermic phase; and wherein coupling comprises heating at a temperature of at least about 45° C. during the endothermic phase.

30. The method of claim 29, wherein the weight ratio of the total of 2,6-dimethylphenol and 2,3,6-trimethylphenol to toluene is at least about 5:1.

31. A method of preparing a poly(arylene ether), comprising:

oxidatively coupling 2,6-dimethylphenol and 2,3,6-trimethylphenol at a reaction temperature, $T_{rxn}$, using an oxygen-containing gas in the presence of toluene and a complex copper catalyst to produce a reaction mixture comprising a poly(arylene ether) copolymer resin;

wherein $T_{rxn}$ satisfies the inequality $$T_{rxn} > \left( \frac{\phi_s - (0.296 \times IV + 1.27 \times TMP - 35.7)}{1.97(1 - 0.00795 \times IV - 0.0249 \times TMP)} \right)$$

where $\phi_s$ is the copolymer concentration (expressed in weight percent), IV is the intrinsic viscosity of the copolymer in chloroform at 25° C. (expressed in mL/g), and TMP is the 2,3,6-trimethylphenol content of the copolymer (expressed in weight percent).

32. The method of claim 31, wherein the poly(arylene ether) copolymer resin comprises an incorporated amine content of at least about 0.35 weight percent based on the total weight of the resin.

33. A poly(arylene ether) resin prepared by the method of claim 1 and comprising an incorporated amine content of at least about 0.35 weight percent based on the total weight of the resin.

* * * * *